US006917050B2

(12) United States Patent  
Lin

(10) Patent No.: US 6,917,050 B2
(45) Date of Patent: Jul. 12, 2005

(54) CODE LEARNING METHOD FOR TIRE MONITORING DEVICE

(75) Inventor: Sheng Hsiung Lin, Kaohsiung (TW)

(73) Assignee: Lite-On Automotive Corp., Kaohsiung (TW)

( * ) Notice: Subject to any disclaimer, the term of this patent is extended or adjusted under 35 U.S.C. 154(b) by 301 days.

(21) Appl. No.: 10/291,358

(22) Filed: Nov. 8, 2002

(65) Prior Publication Data

US 2003/0234723 A1 Dec. 25, 2003

(30) Foreign Application Priority Data

Jun. 24, 2002 (TW) ........................................ 91114120 A

(51) Int. Cl.$^7$ .............................................. B60C 23/00
(52) U.S. Cl. ............................ 250/559.22; 250/559.36; 73/146.2; 340/447
(58) Field of Search ....................... 250/559.22, 559.36; 116/34 R; 200/61.22; 73/146.2; 340/442, 443, 447

(56) References Cited

U.S. PATENT DOCUMENTS 6,246,317 B1 * 6/2001 Pickornik et al. ........... 340/447
6,259,361 B1   7/2001 Robillard et al.
6,340,930 B1 * 1/2002 Lin ............................ 340/447
6,417,766 B1 * 7/2002 Starkey ....................... 340/447
2003/0164758 A1 * 9/2003 King et al. .................. 340/442

OTHER PUBLICATIONS

Taiwanese Application No. 090112305 corresponds to U.S. Appl. No. 10/144,852, now US. Patent No 6753767.
Taiwanese Application No. 089117036 corresponds to U.S. Appl. No. 09/910,725, US. Publication No 2002/0024432.
Taiwanese Application No. 090129767 corresponds to U.S. Appl. No. 10/232,693, now US. Patent No. 6774778.

* cited by examiner

Primary Examiner—Stephone B. Allen

(57) ABSTRACT

A code learning method for a tire monitoring device includes providing a plurality of sensor modules installed in the tires of the vehicle for sensing a condition and acceleration of the tires, each sensor module having an identifying code and a radio transmitter for transmitting signals including the condition of the tire, the acceleration of the tire, and the identifying code of the sensor module; inflating the front tires and the rear tires with different pressures, respectively; receiving the signals for identifying the signals transmitted from the sensor modules installed in the front tires or the rear tires by the order of the pressures in the signals; and driving the vehicle and receiving the signals for identifying the signals transmitted from the sensor modules installed in the left tires or the right tires by the acceleration in the signals.

12 Claims, 3 Drawing Sheets

CODE LEARNING METHOD FOR TIRE MONITORING DEVICE

BACKGROUND OF THE INVENTION

1. Field of the Invention

The present invention generally relates to a tire monitoring device, and more particularly relates to a tire monitoring device for monitoring the conditions of tires, which is provided with a simplified code learning process.

2. Description of the Related Art

Many related technologies and devices for confirming the position relationship between the tire pressure monitor and the tires have been proposed in the conventional arts. For example, Taiwan Patent Application No. 089117036 entitled "Method for Monitoring Tire Pressure of Pneumatic Tire and Device Therefor" filed on Aug. 22, 2000 and commonly assigned to the assignee of the present application, discloses a device which comprises sensor modules installed in each of the pneumatic tires for sensing the conditions of the tires, and then encoding and transmitting the conditions of the tires by radio frequency signals. The device also has a decoder module comprising a radio frequency antenna module for receiving the radio frequency signals transmitted by the sensor module, a memory for recording the value of the predetermined range of the tire conditions and the monitoring data of the tire conditions, a processor for decoding the received radio signals and comparing the decoded signals with the predetermined value in the memory so as to determine the present conditions of the pneumatic tires, a display device for displaying the present conditions of the pneumatic tires, and a buzzer. Such device is used for detecting the abnormal pressure and temperature conditions of the tire and identifying each tire to confirming which tire is in the abnormal conditions.

However, in the prior art, while the decoder module identifies the relationship between the code of the sensor module and the positions of the pneumatic tires, the operator has to deflate the tires of the vehicle. By rapid changing of the tire pressure, the sensor modules installed in the tires continuously transmit signals which can be decoded by the decoder, thereby identifying the relationship between the position of the tires and the sensor modules installed therein. Then, the deflated tires of the vehicle have to be inflated before the driver use the vehicle again. Obviously, such process is relatively time consuming, inconvenient, and complicated.

Taiwan Patent Application No. 090112305 entitled "Code Learning Device of Tire Pressure Monitor", filed on May 17, 2001 and commonly assigned to the assignee of the present application, discloses a code learning device and a hand kit code learning device of tire pressure monitor. However, the foregoing code learning devices require additional device and operation so as to complete the code learning process. This code learning process is complex and complicated and the driver does not often have to replace tires, so the driver may forget how to operate the code learning device when the driver has to proceed with the code learning process.

Further, U.S. Pat. No. 6,259,361 issued to Robillard et al. on Jul. 10, 2001 entitled "Tire Monitoring System", discloses a tire pressure monitoring system using the difference of the temperature and the accelerometer to discriminate between front tires and rear tires, and identify the locations of the tires. However, the front tires typically have a higher temperature than the rear tires because the front tires are the driving tires and close to the engine of the vehicle, but the difference of the temperatures between the front tires and the rear tires are usually affected by external temperature so as to cause incorrect results.

Therefore, the foregoing conventional code learning methods are unable to provide a fast and effective code learning mode for the tire pressure monitor installed in the motor vehicle to define the identifying code of each pneumatic tire. There exists a need for a code learning device of tire pressure monitor to simplifying the code learning process of the tire pressure monitor.

SUMMARY OF THE INVENTION

It is an object of the present invention to provide a tire monitoring device for monitoring conditions of tires, and the tire monitoring device is able to easily identify the positions of the tire pressure sensors installed in the respective tires.

It is another object of the present invention to provide a code learning method for tire monitoring device for identifying the positions of the tire pressure sensor installed in the respective tires.

In order to achieve the objects mentioned hereinabove, the present invention provides a code learning method for a tire monitoring device installed in a vehicle comprising a front left tire, a front right tire, a rear left tire, and a rear right tire. The method comprises the following steps: providing a plurality of sensor modules installed in the tires of the vehicle for sensing condition and acceleration of the tires and each having an identifying code and a radio transmitter for transmitting signals including the condition of the tire, the acceleration of the tire, and the identifying code of the sensor module; inflating the front tires and the rear tires with different pressures, respectively; receiving the signals for identifying the signals transmitted from the sensor modules installed in the front tires or the rear tires by the order of the pressures in the signals; and driving the vehicle and receiving the signals for identifying the signals transmitted from the sensor modules installed in the left tires or the right tires by the acceleration in the signals.

According to another aspect of the present invention, the present invention further provides a code learning method for a tire monitoring device installed in a vehicle comprising a plurality of tires. The method comprises the following steps: providing a plurality of sensor modules installed in the tires of the vehicle for sensing condition of the tires and each having an identifying code and a radio transmitter for transmitting signals including the condition of the tire and the identifying code of the sensor module; inflating the plurality of tires of the vehicle with pressure in a predetermined order according to the positions of the tire; and receiving the signals for identifying the positions and identifying codes of the sensor modules transmitting the signals by the order of the pressures in the signals.

Accordingly, the tire monitor of the present invention can identify the signals transmitted from the respective tires without complicated code learning process. Therefore, a user can easily complete the code learning operation after replacing a tire.

BRIEF DESCRIPTION OF THE DRAWINGS

Other objects, advantages, and novel features of the invention will become more apparent from the following detailed description when taken in conjunction with the accompanying drawings.

DESCRIPTION OF THE PREFERRED EMBODIMENT

Figure 1:
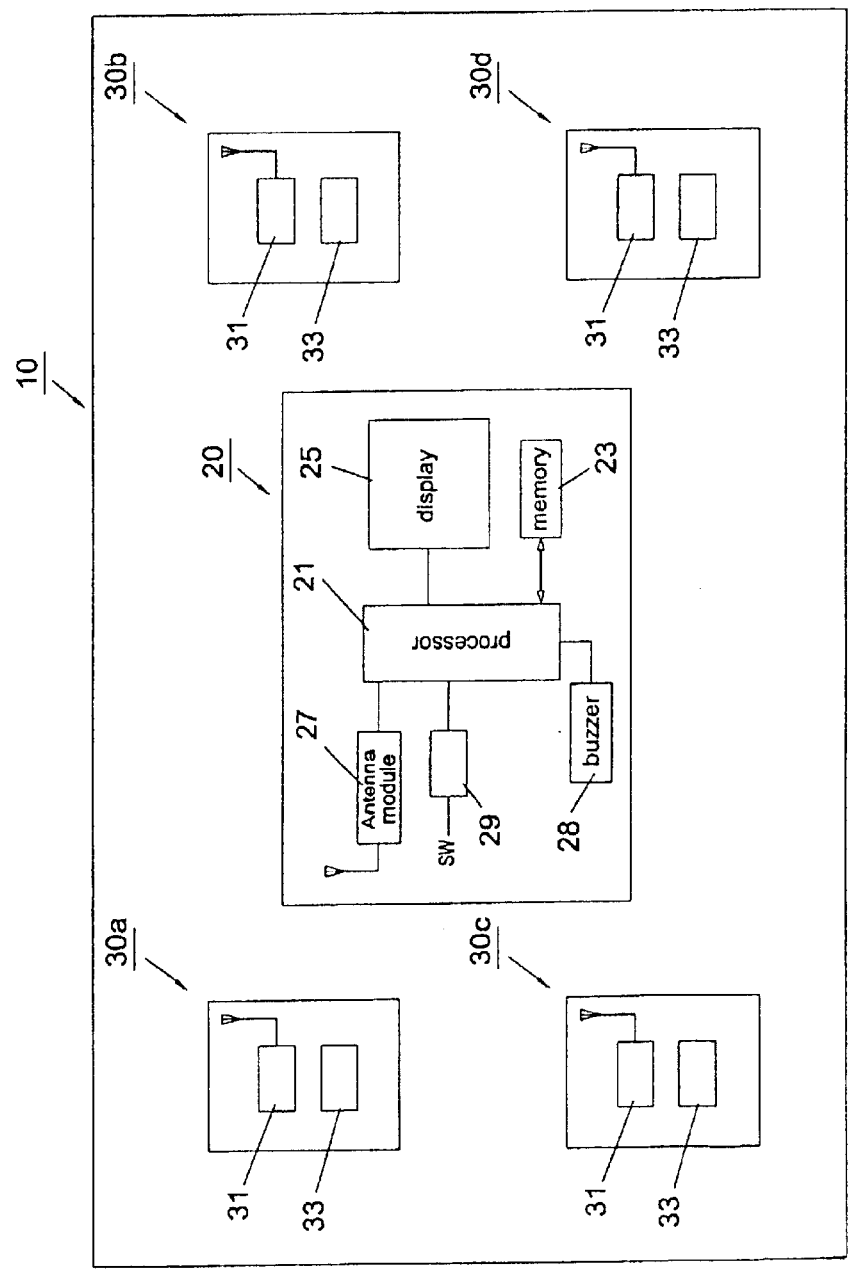
FIG. 1 is a system block diagram of a tire monitoring device comprising a code learning process according to the present invention.
Figure 2:
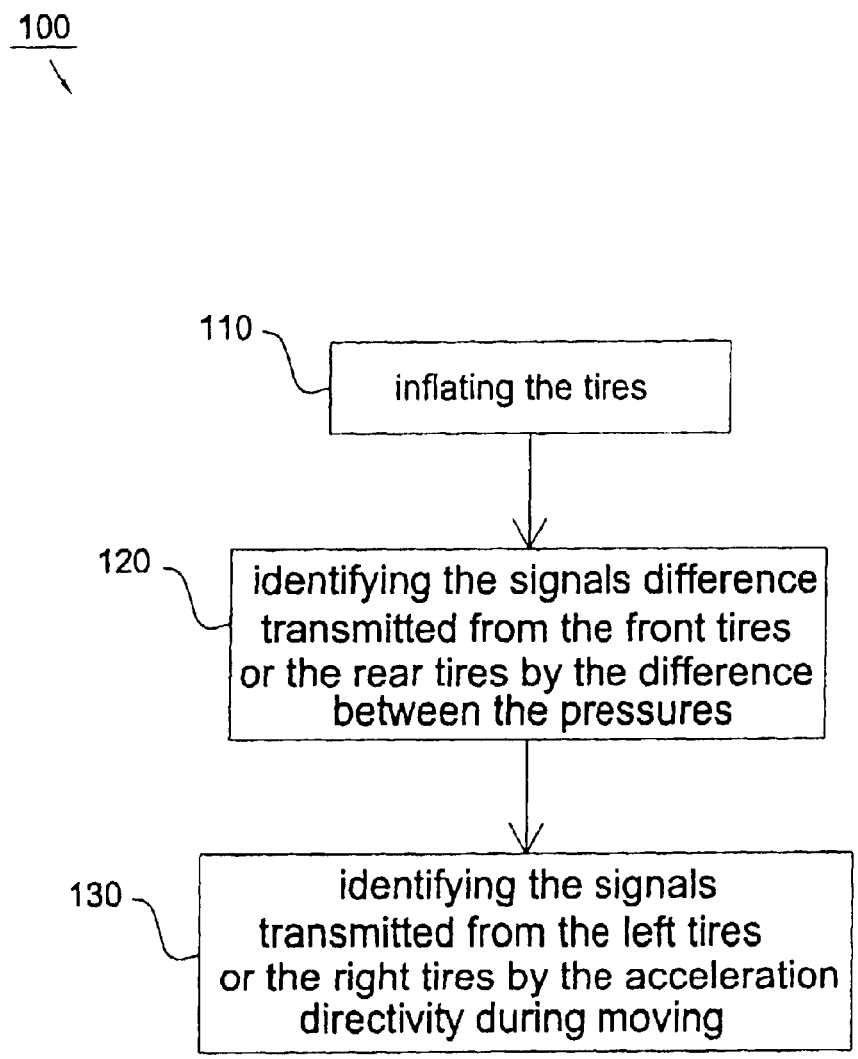
FIG. 2 is a flow chart of a code learning process of the tire monitoring device according to one embodiment of the present invention.
Figure 3:
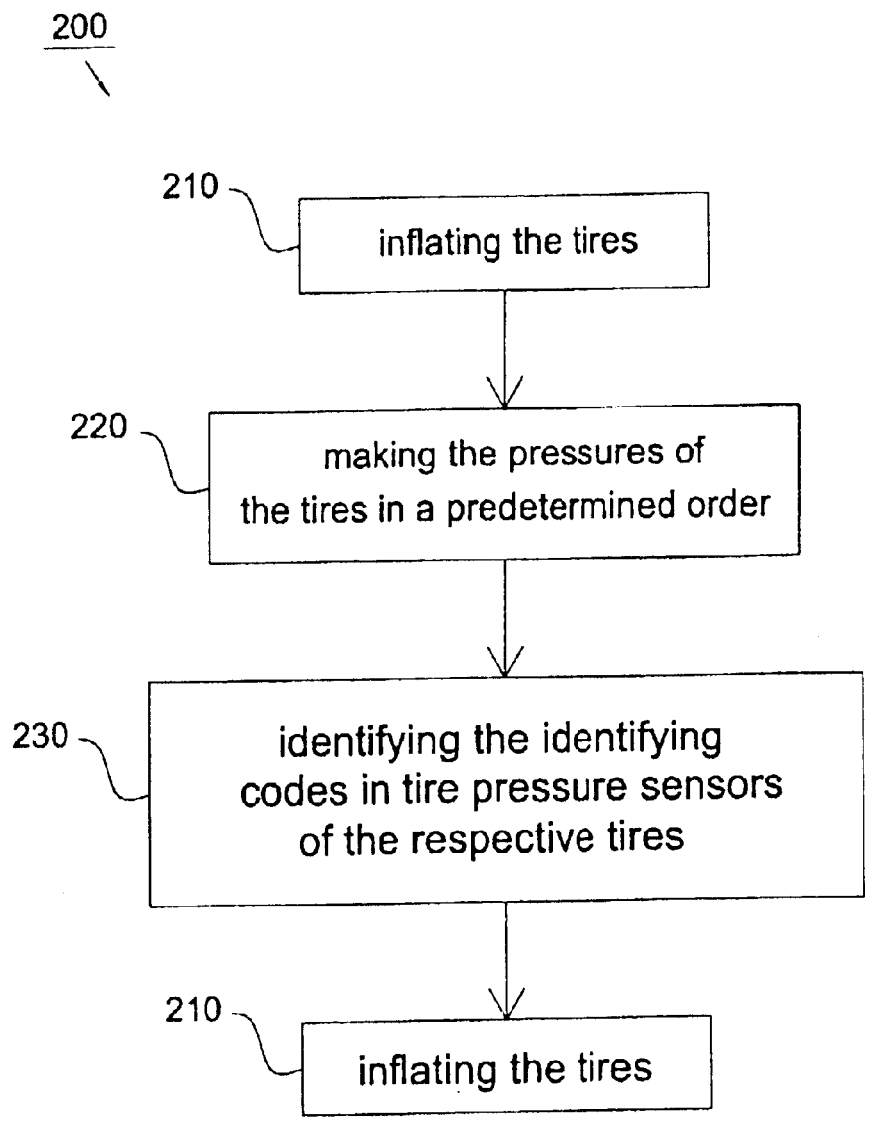
FIG. 3 is a flow chart of a code learning process of the tire monitoring device according to another embodiment of the present invention.

Now referring to FIG. 1, it shows a block diagram of a tire monitoring device 10 according to the present invention. The tire monitoring device 10 installed in a vehicle comprises four sensor modules 30a, 30b, 30c, 30d, and a decoder module 20.

The four sensor modules 30a, 30b, 30c, and 30d are respectively installed in the front left (FL) tire, the front right (FR) tire, the rear left (RL) tire, and the rear right (RR) tire. Each of the sensor modules 30a–d comprises a sensor application-specific integrated circuit (ASIC) 33 and a radio frequency transmitter 31. The sensor modules 30a–d installed in the respective pneumatic tires are used for sensing the conditions of the tires, and then encoding and transmitting the conditions of the tires by radio frequency signals. The sensor ASIC 33 transmits the data of the present conditions of tires, such as the pressure, temperature, and acceleration of the tires, to the radio frequency transmitter 31 for transmitting the radio frequency signals about every minute. Such sensor module can be seen in the Taiwan Patent Application No. 089117036 entitled "Method for Monitoring Tire Pressure of Pneumatic Tire and Device Therefor" filed on Aug. 22, 2000 and No. 090129767 entitled "TIRE PRESSURE MONITORING DEVICE AND CODE LEARNING METHOD THEREFOR" filed on Nov. 29, 2001 filed by the present Assignee and commonly assigned to the assignee of the present application, which are incorporated herein by reference.

The decoder module 20 comprises a radio frequency antenna module 27 for receiving the radio frequency signals, a memory 23 for recording the values of the predetermined range of the tire conditions and the monitoring date of the tire conditions, a processor 21 for decoding the received radio signals and comparing the decoded signals with the values in the memory 23 so as to determine the present conditions of the pneumatic tires, a display device 25 for displaying the present conditions of the pneumatic tires, and a buzzer 28 for generating a warning beep. In one embodiment of the present invention, the conditions of the tires include the temperature and pressure of the tires. The decoder module 20 further comprises a switch interface 29 connected to a starting switch SW of the vehicle such that the decoder module 20 is actuated by starting the the vehicle and the operation of the decoder 20 is controlled by the starting switch SW.

The radio signals transmitted from each sensor ASIC 33 include not only the data of the tire conditions but also an identifying code of the sensor ASIC 33. When the processor 21 receives a signal during monitoring, the processor 21 can compare the identifying code of the signal with the identifying code of the respective tires recorded in the memory 23 so as to identify the tire transmitting the signal.

As mentioned above, before the tire monitoring device 10 is used for monitoring the condition of the tires, the tire monitoring device 10 firstly needs to carry out a code learning process for identifying the identifying codes of the sensor modules installed in the respective tires of the vehicle. In a code learning process 100 according to one embodiment of the present invention, a user first inflates the tires of the vehicle in a step 110. In generally, because typically current vehicles are front engine type, the specific pressure of the front tire is higher than the specific pressure of the rear tire. After the tire inflating operation of the step 110, the processor 21 will read the tire conditions and the identifying codes from the signals transmitted from the radio frequency transmitter 31 of the respective sensor modules 30a, 30b, 30c, and 30d. In a step 120, since the pressure of the front tires is higher then that of the rear tires, the processor 21 can identify the signal transmitted from the front tires or the rear tires by the order of the pressures in the signals. In a step 130, a user drives the vehicle and processor 21 can identify the signal transmitted from the left tires or the right tires by the acceleration sensed by the sensor modules 30a, 30b, 30c, and 30d.

Specifically, it is well know that due to the directivity of the acceleration, the right tires are deceleration when the left tires are acceleration during the moving of the vehicle. Therefore, the processor 21 can identify the signal transmitted from the left tires or the right tires by the acceleration and the deceleration. In addition, when the vehicle further comprises a spare tire having a sensor module, the processor 21 can identify the signal transmitted from the spare tire by zero acceleration of the spare tire.

Therefore, the tire monitor device 10 can identify the signals transmitted from the respective tires by the pressure difference between the front and the rear tires and by the directivity of the acceleration of the left and the right tires. In other words, the memory 23 can record the identifying codes of the sensor modules installed in the respective tires for monitoring the conditions of the respective tires.

In a code learning process 200 according to another embodiment of the present invention, a user first inflates the tires of the vehicle in a step 210 such that the pressures of the respective tires is inflated to a predetermined order of pressure in a step 220. For example, the front left (FL) tire, the front right (FR) tire, the rear left (RL) tire, and the rear right (RR) tire are inflated with the pressures of 32 Psi, 29 Psi, 26 Psi, and 23 Psi, respectively. That is, the order of pressure values of the tires is front left (FL) tire, the front right (FR) tire, the rear left (RL) tire, and the rear right (RR) tire in turn. It should be noted that the difference between the predetermined pressures are decided on the sensor ASIC 33, and the preferable difference in the embodiment of the present invention is about 3 Psi. Then, in a step 230, the decoder module 20 receives the tire condition signals transmitted from the sensor modules 30a, 30b, 30c, and 30d, and the processor 21 identifies the order of the pressures in the signals so as to identify the signals transmitted from the respective tires. On the other hand, the memory 23 can record the identifying codes of the respective sensor modules installed in the respective tires. Finally, in a step 240, the user inflates the tires again such that the pressure of the each tire is inflated with the specific pressures.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A code learning method for a tire monitoring device installed in a vehicle comprising a front left tire, a front right tire, a rear left tire, and a rear right tire, comprising the following steps of:

providing a plurality of sensor modules installed in the tires of the vehicle for sensing condition and acceleration of the tires and each having an identifying code and a radio transmitter for transmitting signals including the condition of the tire, the acceleration of the tire, and the identifying code of the sensor module;

inflating the front tires and the rear tires with different pressures, respectively;

receiving the signals and, by means of the order of the pressures in the signals, identifying the signals transmitted from the sensor modules installed in the front tires or the rear tires; and driving the vehicle, receiving the signals and, by the acceleration in the signals, identifying the signals transmitted from the sensor modules installed in the left tires or the right tires.

2. The code learning method according to claim 1, wherein the vehicle further comprises a spare tire and the code learning method further comprises the steps of:

providing a sensor module installed in the spare tire of the vehicle for sensing condition and acceleration of the spare tire and having an identifying code and a radio transmitter for transmitting signals including the condition of the tire, the acceleration of the tire, and the identifying code of the sensor module; and driving the vehicle, receiving the signals and, by means of the acceleration in the signals, identifying the signals transmitted for the sensor module installed in the spare tire.

3. The code learning method according to claim 1, wherein the signals are radio frequency signals.

4. The code learning method according to claim 1, wherein the condition of the tire is selected from the group consisting of pressure, temperature, and the combination thereof.

5. A code learning method for a tire monitoring device installed in a vehicle comprising a plurality of tires, comprising the following steps of:

providing a plurality of sensor modules installed in the tires of the vehicle for sensing condition of the tires and each having an identifying code and a radio transmitter for transmitting signals including the condition of the tire and the identifying code of the sensor module;

inflating the plurality of tires of the vehicle with pressure in a predetermined order according to the positions of the tires; and receiving the signals and, by the order of the pressures in the signals, identifying the positions and the identifying codes of the sensor modules transmitting the signals.

6. The code learning method according to claim 5, wherein the signals are radio frequency signals.

7. The code learning method according to claim 5, wherein the condition of the tire is selected from the group consisting of pressure, temperature, and the combination thereof.

8. A code learning method for a tire monitoring device of a vehicle, the tire monitoring device comprising a central module and a plurality of sensor modules each being installed in one of a plurality of tires of the vehicle and having an identifying code unique for said sensor module, said method comprising the steps of:

inflating the tires;

sensing, by each of the sensor modules, a pressure of the respective tire;

driving the vehicle, simultaneously with said driving, detecting, by each of the sensor modules, whether the respective tire is accelerated or decelerated;

transmitting, by each of the sensor modules, to the central module the identifying code of the transmitting sensor module, the sensed pressure of the respective tire, and acceleration data indicative of whether the respective tire is accelerated or decelerated; and determining, at the central module, on which tire each of the sensor modules is installed, based on both the sensed pressure and the acceleration data transmitted by said sensor module.

9. The method of claim 8, wherein said inflating comprises inflating the front wheel tires of the vehicle with pressures different from the rear wheel tires of the vehicle, and said determining comprises dividing the sensor modules into a front wheel tire group and a rear wheel tire group based on the different sensed pressures, associating the sensor modules of the front wheel tire group with either the left or the right front wheel tires based on the acceleration data transmitted by the sensor modules of the front wheel tire group, and associating the sensor modules of the rear wheel tire group with either the left or the right rear wheel tires based on the acceleration data transmitted by the sensor modules of the rear wheel tire group.

10. The method of claim 9, wherein one of the tires of the vehicle is a spare tire, and said determining comprises identifying the sensor module of the spare tire based on zero acceleration data transmitted by said sensor module.

11. The method of claim 9, wherein the signals are radio frequency signals.

12. The method of claim 9, wherein the signals further comprises information on temperatures of the respective tires.

* * * * *